United States Patent [19]
Bent

[11] Patent Number: 6,014,640
[45] Date of Patent: Jan. 11, 2000

[54] ACCOUNTING ALLOCATION METHOD

[76] Inventor: Kirke M. Bent, 29 Pine St., Chatham, N.J. 07928

[21] Appl. No.: 08/568,814

[22] Filed: Dec. 7, 1995

[51] Int. Cl.$^7$ ..................................................... G06F 17/60
[52] U.S. Cl. .............................................................. 705/30
[58] Field of Search ................................ 395/201; 705/1, 705/30, 31, 32, 33, 34

[56] References Cited

U.S. PATENT DOCUMENTS

| | | | |
|---|---|---|---|
| 4,885,686 | 12/1989 | Vanderbei | 364/468.05 |
| 5,790,847 | 8/1998 | Fisk et al. | 707/4 |
| 5,799,286 | 8/1998 | Morgan et al. | 705/30 |

OTHER PUBLICATIONS

Jacobs et al., "An Alternative Method For Allocating Service Department Costs", Ohio CPA Journal, vol. 52, No. 2, Apr. 1993, pp. 20–24.

Joyce Chen, "Cost Allocation and External Acquisition of Services When Self–Services Exist", The Accounting Review, vol. 58, No. 3 Jul. 1983, pp. 600–605.

Ovadia et al., "A Multiplier Formulation of Service Department Cost Allocation Models", Cost and Management, vol. 56, No. 5, Sep./Oct. 1982, pp. 48–51.

B.C. Ghosh, Using Matrix Algebra For Cost Allocation and Variance Analysis, Management Accounting–London, vol. 56, No. 6, Jun. 1978, pp. 248–249.

Brown et al., "How PC 's Can Solve the Cost Allocation Problem", Management Accounting, vol. 70, No. 5, Nov. 1988, pp. 34–38.

Pirrong et al., "Cost Allocation Using Spreadsheets", National Public Accountant, vol. 34, No. 5, May 1989, pp. 36–43.

Kemeny, John G., et al., Finite Mathematics With Business Applications, 2d Ed., pp. 250–251 (Englewood Cliffs, N.J., Prentice–Hall, Inc.: 1972).

Atkinson, Athony A., et al., Management Accounting 2d Ed., pp. 279–280 (Upper Saddle River, N.J., Prentice–Hall, Inc.: 1997).

*Primary Examiner*—Eric W. Stamber
*Attorney, Agent, or Firm*—Joel Miller

[57] ABSTRACT

An expense allocation method utilizes matrix multiplication to transform a set of reciprocal or cascading allocation rules into a new set of one-step allocation rules. The new set of rules reallocates amounts directly to the ultimate destination without going through numerous intermediate levels of reallocation. By taking advantage of the specific structure of the matrix, and partitioning the matrix into four (4) subparts, the matrix multiplication process is greatly simplified. The expense allocation method can be easily and efficiently implemented on a computer system, including computers based upon parallel or vector architectures. This invention permits most allocation work to be done before the end of an accounting period, allowing end-of-period accounting work to be completed sooner. Alternatively, expenses can be allocated as they occur, rather than waiting until the end of a period.

37 Claims, 4 Drawing Sheets

ACCOUNTING ALLOCATION METHOD

BACKGROUND OF THE INVENTION

1. Field of the Invention

This invention relates to methods for allocating or distributing a given quantity into a number of predetermined categories and more particularly to an such methods involving multiple allocation steps.

2. Description of the Prior Art

Large organizations have accounting and expense management systems. An important function of these systems is the classification of financial transactions and expenses into useful categories. For example, transactions are classified into income, expense, asset, liability, and capital accounts. In many cases, the transactions must be further classified into other categories for the purposes of management accounting.

In typical accounting terminology, the problem of allocating expenses arises when an enterprise has both service and production departments. In a simple model, production departments produce goods for sale and all of the cost of the service departments is attributable to those goods. Service departments provide services to production departments and also to each other.

The costs of operating the service departments are part of the cost of running the enterprise so they must be attributed or allocated to the goods produced so that the final costs will reflect the total costs of the enterprise. When service departments provide service to each other, the process is called reciprocal allocation.

The simplest form of allocation is called the direct method. Reciprocal allocations are ignored and all the costs of the service departments are allocated to production departments according to some basis, normally the proportionate use of the service by the production departments. When the amount of services provided to other service departments is large, this can produce significant distortion.

Another form of allocation is called the step or sequential method. One service department is chosen, usually the one that provides the largest dollar value of service, and its costs are allocated to all of the other departments, service and production. The process is repeated with the next service department. Its costs, possibly augmented as a result of the first step, are allocated to all of the remaining departments, that is to all departments except the one that was treated in the first step. The process is repeated until all the costs of the service departments have been allocated this way. The step method recognizes some, but not all, of the influence of reciprocal allocation.

The term reciprocal allocation is reserved for a third method, although the previous two methods deal with reciprocal allocations to some degree. The reciprocal allocation method is well known and gives full account to reciprocal allocations among service departments. It is based on calculation of an intermediate quantity that has no natural interpretation. For each service department, the intermediate quantity is equal to the preallocated costs of that department plus the proportional share of the preallocated costs of the other service departments that is due to its use of the service of those departments. This relationship can be expressed as an equation. Taken together, the equations for all of the service departments can be treated as a system of simultaneous equations. The solution of the system yields the intermediate quantities for all of the service departments. The difficulty of interpretation comes about because the sum of the intermediate quantities, which are augmented service department costs, exceeds the sum of the actual service department costs.

The second step of the process produces the final amount of service department cost allocated to each production department. This is done by using the allocation fractions of service department costs to production departments. When these allocations are applied to the intermediate augmented costs described in the first step, they yield the final amount of service department costs allocated to each production department. These costs will sum to the total service department costs.

For example, consider an advertising expense. A purchase of advertising would result in a transaction to reduce a cash account and another to increase an advertising expense account. The advertising expense might be classified (reallocated or redistributed) to the expense accounts of some number of marketing channels. It could then be further reallocated to the expense accounts of some number of manufacturing plants and then to the expense accounts associated with some number of products made in each manufacturing plant. Thus, there is a cascading network of many levels of reallocation. Consequently, the expense is reallocated several times in the process of developing the ultimate classification.

It is common practice to do this sort of reallocation at the end of the period in connection with closing accounts. To do this, reallocation proportions are provided to the accounting system.

The prior art processes, even when implemented on high-speed computers, are slow and inefficient. Furthermore, the prior art, due to the cascading nature of the allocation rules, does not provide a statement of where an initial expense will ultimately be allocated.

The prior art contains extensive literature on the use of matrix methods for expense allocations, focusing on the solution of simultaneous equations of the type discussed above. Much of the literature on solving simultaneous equations is also applicable.

The prior art reciprocal allocation method has certain disadvantages. Because the reciprocal allocation method works with summarized costs from-the outset, it requires that those costs must be accumulated before the process can begin. This accumulation cannot be completed before the end of an accounting period. Consequently, important accounting information is not available until the end of the accounting period and management decisions may have to be delayed until that time.

SUMMARY OF THE INVENTION

A primary object of the instant invention is an expense allocation method that processes all expenses to be allocated in one step.

Another object of this invention is an expense allocation method that minimizes the number of calculations needed to allocate expenses to multiple accounts according to predetermined allocation rules.

Another object of this invention is an expense allocation method that minimizes the amount of iterative calculating required to allocate expenses to multiple accounts according to a set of cascading allocation rules.

Still another object of this invention is a method of transforming cascading expense allocation rules so that expenses can be allocated economically one transaction at a time, while providing accurate information between accounting cycles.

Still another object of this invention is an expense allocation method that is easily and efficiently implemented on a computer system, including those computers based upon parallel or vector architectures.

In short, this invention is an expense allocation method that utilizes matrix multiplication to transform a set of reciprocal or cascading allocation rules into a new set of one-step allocation rules. The new set of rules reallocates amounts directly to the ultimate destination without going through numerous intermediate levels of reallocation. Thus, from an allocation standpoint, the new set of rules, although functionally equivalent to the original rules, are more useful. By taking advantage of the specific structure of the matrix, and partitioning the matrix into four (4) subparts, the matrix multiplication process is greatly simplified. The expense allocation method can be easily and efficiently implemented on a computer system.

This invention permits most preparatory allocation work to be done before the end of an accounting period, allowing end-of-period accounting work to be completed sooner. Alternatively, expenses may be allocated simpler, quicker, and more economically as they occur, rather than waiting until the end of a period.

DESCRIPTION OF PREFERRED EMBODIMENT

Figure 1:
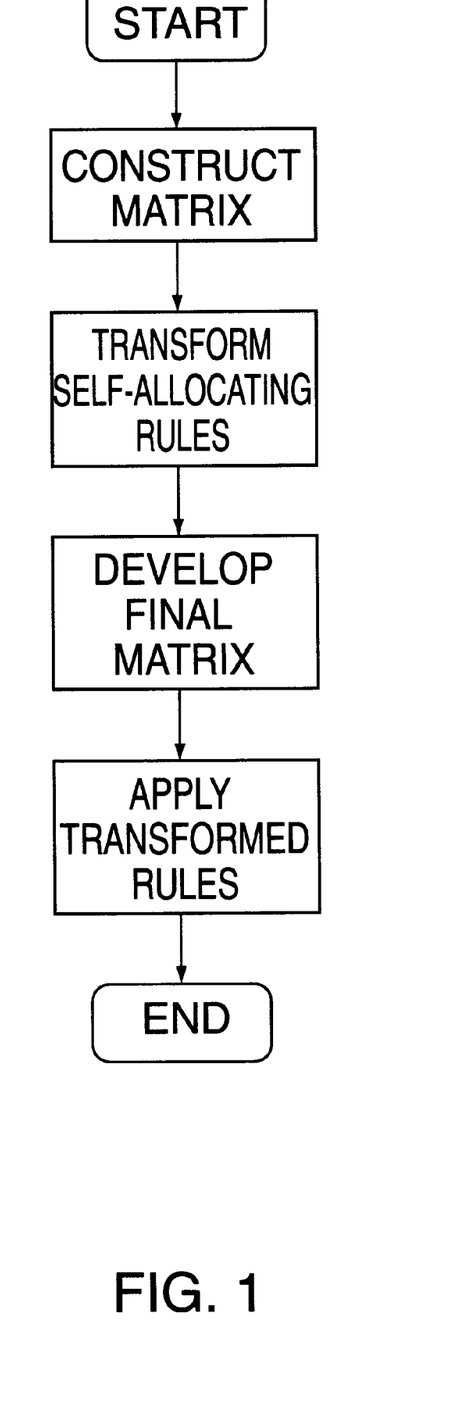
FIG. 1 is a block diagram overview of the accounting allocation method.
Figure 2:
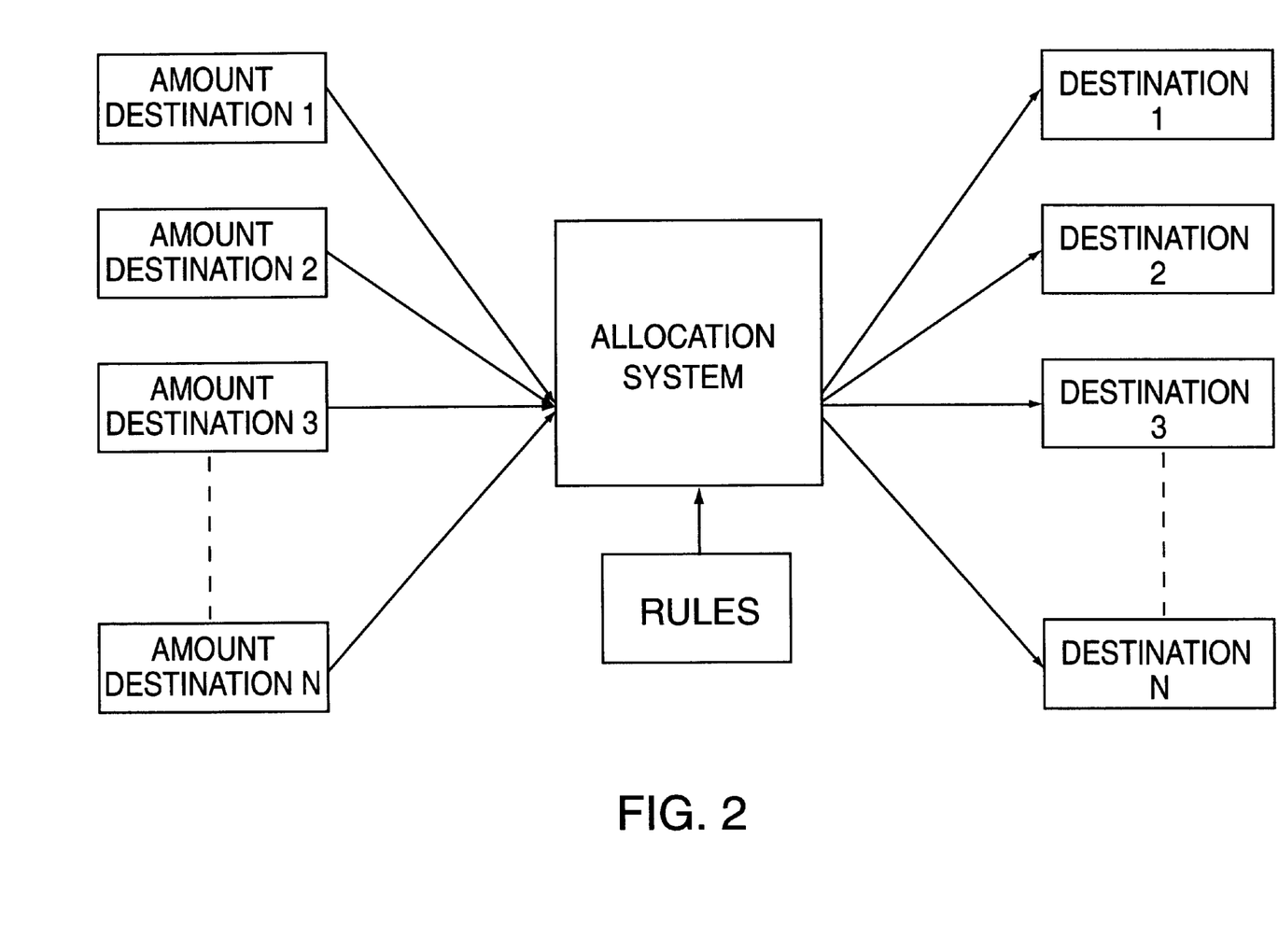
FIG. 2 is a block diagram of the system utilizing the method.

In its preferred embodiment (see FIG. 1 overview and the block diagram of FIG. 2), this invention comprises a method of constructing a transformed set of rules based upon the original allocation rules which will take the initial quantities and, in one step, allocate these quantities directly to the ultimate destinations without going through numerous intermediate levels of reallocation. Thereby, one circumvents the two-step process of solving a set of simultaneous equations and then allocating the intermediate quantities.

For the preferred embodiment, a "destination" is any element that can have amounts allocated to it. In the example above, destinations include, among others, accounts representing departments, plants, and products. Destinations are grouped into two categories. Intermediate destinations are initial or other temporary, non-final destinations. Terminal destinations are final destinations.

Rules reallocate amounts from one destination to other destinations. An intermediate rule begins from an intermediate destination and may reallocate to other intermediate destinations, terminal destinations, or both. A terminal rule begins from a terminal destination and does not further reallocate.

The rules must meet the following requirements:
1. Each rule must completely reallocate the allocated destination (the reallocation done by each rule must equal 1.00 or 100%).
2. No group of intermediate rules of any size can reallocate only among themselves. Otherwise, there would be "circular" allocation and endless iteration without reaching final allocation.
3. At least one intermediate rule must reallocate, if only partly, to a terminal destination.
4. A terminal rule must reallocate completely to the corresponding terminal destination. These requirements assure that iterative application of the rules will result in complete allocation to terminal destinations.

Preferably, this method is implemented via a matrix. The matrix used is a square matrix with a row and a column for each destination.

To construct the matrix, all the destinations are put in a list with all intermediate destinations preceding all terminal destinations. The order within the intermediate destinations and within the terminal destinations is arbitrary, but must remain fixed once set. Following the order in the list, each destination becomes the label for the corresponding row and column of the matrix. To fill the matrix, the allocation destinations included in each rule are ordered to correspond to the column labels in the matrix, adding a "zero" allocation to any destination where needed; thereby all matrix columns are accounted for without altering the original rule. That rule then becomes the row of the matrix labeled with the destination from which that rule allocates. Thus, the coefficients in each row total 1.

For each terminal destination, the corresponding matrix row has only one non-zero entry—"1" in the column corresponding to that terminal destination.

An example of a set of rules is shown in Chart 1. The destinations are given the arbitrary names of a, b, c, d, e, and f. Destinations a, b, and c are intermediate destinations; destinations d, e, and f are terminal destinations.

| Chart 1 | |
|---|---|
| Allocated Destination | Reallocation Rule |
| a | 25% to b, 50% to c, 25% to d |
| b | 50% to d, 50% to e |
| c | 50% to b, 50% to f |
| d | 100% to d |
| e | 100% to e |
| f | 100% to f |

These rule and destinations are arranged into the chart shown in Chart 2.

| Chart 2 | | | | | |
|---|---|---|---|---|---|
| | a | b | c | d | e | f |
| a | | .25 | .50 | .25 | | |
| b | | | | .50 | .50 | |
| c | | .50 | | | | .50 |
| d | | | | 1.0 | | |
| e | | | | | 1.0 | |
| f | | | | | | 1.0 |

The corresponding matrix is shown in Chart 3.

| Chart 3 | | | | | |
|---|---|---|---|---|---|
| (0 | .25 | .50 | .25 | 0 | 0) |
| (0 | 0 | 0 | .50 | .50 | 0) |
| (0 | .50 | 0 | 0 | .50 | 0) |
| (0 | 0 | 0 | 1 | 0 | 0) |
| (0 | 0 | 0 | 0 | 1 | 0) |
| (0 | 0 | 0 | 0 | 0 | 1) |

The matrix can be partitioned into four (4) sections by splitting the matrix between the intermediate destinations and the terminal destinations as shown in Chart 4. The partitions are labeled A, B, C, and D.

Chart 4

```
(0    .25   .50  |  .25    0     0)
(0    0     0    |  .50   .50    0)
(0    .50   0    |   0    .50    0)            (A B)
(-    ---   ---  +- ---   ---   -)    =
(0    0     0    |   1     0     0)            (C D)
(0    0     0    |   0     1     0)
(0    0     0    |   0     0     1)
```

The partitioned matrix exhibits the following properties:

1. Each row adds up to 1.00 (full reallocation).
2. If Partition A has some non-zero entries, some rules reallocate intermediate destinations to other intermediate destinations.
3. Partition B has some non-zero entries (some rules reallocate intermediate destinations to terminal destinations).
4. Partition C is all zeros (no rule reallocates a terminal destination to an intermediate destination).
5. Partition D has all ones along the principal diagonal, and zeros everywhere else (each terminal destination is reallocated 100% to that same terminal destination, and not to any other destination).

The allocation process begins by transforming all rules which involve intermediate destinations that allocate to themselves ("self-allocation"). This transformation is accomplished by stepping along the principal diagonal of Partition A, the list of what each intermediate destination allocates to itself. Each non-zero diagonal component indicates a rules which includes self-allocation.

For each such non-zero component ($A_{ii}$), the corresponding rule is transformed by multiplying each off-diagonal component, including those components in B, by the quantity $[1/(1-A_{ii})]$. Then component $[A_{ii}]$ is set to zero (0). This scales the sum of all the non-self-allocating destinations, which began by totaling $(1-A_{ii})$, up to $(1-A_{ii})*[1/(1-A_{ii})] = 1 = 100\%$. Thus, that rule, as transformed, no longer contains self-allocation. Consequently, the resulting matrix contains no intermediate destinations which self-allocate.

Next, the allocation process continues by multiplying the matrix by itself. The number of calculations needed to multiply the matrix by itself is significantly reduced by taking advantage of the properties exhibited by the partitioned matrix.

Partition C is always all zeros. In matrix multiplication, that partition is zero (called "0"): anything times 0 is zero. Also, Partition D is always all ones on the principal diagonal and all zeros everywhere else. In matrix multiplication, that partition is unity (called "I"): anything times I equals itself.

Thus, multiplying the partitioned matrix by itself yields the following result:

```
(A B) x (A B) = (A B) x (A B) = (AA+B0   AB +BI) = (AA      AB+B)
(C D)   (C D)   (0 I)   (0 I)   (0A+B0   0B+II)    (0       I)
```

Partitions C and D are constant. Because they do not change, it is not necessary to recalculate them at all. Also, the remaining calculations involve much smaller matrices. Thus, there are significantly fewer calculations required for the matrix multiplication. For a large matrix, this would be very noticeable. Also, it is only necessary to work with the intermediate rules, not with the terminal rules.

The matrix is processed as follows:

The matrix is multiplied by itself, thereby producing a new matrix representing transformed rules. The new matrix also exhibits the matrix behavior indicated above, and the rules represented by rows in the new matrix satisfy all the rule requirements listed above.

If all coefficients in Partition A are zero, there will be no further reallocation to intermediate destinations. Thus, the new matrix is the final matrix which will allocate all initial quantities in one step to terminal destinations. Further multiplication of this final matrix by the original matrix will only again yield the final matrix.

If there are some non-zero coefficients in Partition A, further matrix processing is needed to achieve the desired one-step allocation. The new matrix is then multiplied by itself, yielding another matrix which exhibits the above matrix behavior and satisfies the above rule requirements. This matrix multiplication continues until the produced matrix has all zero coefficients in Partition A, and is thus the final matrix.

In many circumstances, some coefficients in Partition A will continually decrease towards zero but will never become exactly zero regardless of the number of iterations. In these situations, one must set a threshold below which these non-zero coefficients are considered to be zero without having any non-negligible effect on the results. Illustratively, considering the coefficients to be zero when the sum of all rows is less than 0.00001 allows for producing accurate results in a reasonable number of iterations.

Alternatively, the new matrix could be multiplied by the original matrix until a final matrix is produced. However, multiplying the new matrix by itself rather than by the original matrix not only produces the same final matrix, but results in many less multiplication iterations to produce the final matrix.

Because all coefficients of Partition A in the final matrix either equal zero or are considered to be zero, this process yields a final matrix of the form:

(0 X)
(0 I)

Finally, the final matrix is applied to a set of costs or other quantities to completely allocate these quantities to terminal destinations in only one step. A vector is created by ordering these costs following the list of destinations used in creating the above original matrix, with intermediate destinations preceding terminal destinations. This vector is multiplied by the final matrix, producing a final vector which contains the complete allocations to terminal destinations.

The cost vector is created as follows:

(a b c | d e f) = (S | T)

$S = (a\ b\ c)$ = costs allocated to intermediate destinations; and $T = (d\ e\ f)$ = costs allocated to terminal destinations.

The one-step allocation process comprises the multiplication:

$$(S \quad T) \times \begin{pmatrix} 0 & X \\ 0 & I \end{pmatrix} = (0 \quad SX + T)$$

The resulting Partition S is zero, indicating that there are no remaining allocations to intermediate destinations; all allocations are in the resulting Partition T, representing the terminal destinations. Thus, in one-step, the costs are completely allocated to terminal destinations.

EXAMPLE

Utilizing the allocation rules described in Chart 1 above, with the following costs:

a=600
b=500
c=400
d=300
e=0
f=100

The cost vector is:

(600 500 400|300 0 100)=(S|T)

The original allocation matrix is as shown in Chart 4 above:

$$\begin{pmatrix} 0 & .25 & .50 & .25 & 0 & 0 \\ 0 & 0 & 0 & .50 & .50 & 0 \\ 0 & .50 & 0 & 0 & .50 & 0 \\ \hline 0 & 0 & 0 & 1 & 0 & 0 \\ 0 & 0 & 0 & 0 & 1 & 0 \\ 0 & 0 & 0 & 0 & 0 & 1 \end{pmatrix} = \begin{pmatrix} (A \ B) \\ (C \ D) \end{pmatrix}$$

The final matrix is produced in two iterations: (1) multiplying the original matrix by itself, and then (2) multiplying the resulting matrix by itself. The final matrix is shown below:

$$\begin{pmatrix} 0 & 0 & 0 & .50 & .50 & 0 \\ 0 & 0 & 0 & .50 & .50 & 0 \\ 0 & 0 & 0 & .25 & .75 & 0 \\ \hline 0 & 0 & 0 & 1 & 0 & 0 \\ 0 & 0 & 0 & 0 & 1 & 0 \\ 0 & 0 & 0 & 0 & 0 & 1 \end{pmatrix} = \begin{pmatrix} (0 \ X) \\ (0 \ I) \end{pmatrix}$$

The complete allocations are accomplished by calculating:

(SX+T)=(650 850 0)+(300 0 100)=(950 850 100)=(d e f)

It will be noted that, as required, the total initial costs (1,900) equals the total completely allocated costs (1,900).

This process has the following benefits over the prior art:
1. There is total allocation of quantities in one step, rather than one procedure for each individual quantity.
2. The process can be implemented effectively on modern computer hardware utilizing vector processing circuits and/or multiple processors, and matrix manipulation software, for speedy processing.
3. This process can be generalized to applications other than accounting.

The preferred embodiment utilizing computer hardware is summarized as follows:

Two storage areas are designated in the computer memory. These areas are used alternatively. Initially, one area is designated as the Current Matrix. The other area is the Alternate Matrix. The rules are stored as a partitioned matrix in the form described above in the Current Matrix. The Current Matrix is multiplied by itself, utilizing the streamlined multiplication procedure for the matrix as partitioned. The result is stored in the Alternate Matrix. The Alternate Matrix is checked to see if it is the final matrix. If not, the Alternate Matrix is designated as the new Current Matrix; and the former Current Matrix is designated as the new Alternate Matrix. The multiplication process is repeated iteratively until the final matrix is obtained.

The specific steps in this preferred embodiment follow, in which:

$A_c$ is Partition A of the Current Matrix.
$B_c$ is Partition B of the Current Matrix.
$A_a$ is Partition A of the Alternate Matrix.
$B_a$ is Partition B of the Alternate Matrix.

1. Designate storage area 1 as the Current Matrix. Designate storage area 2 as the Alternate Matrix.
2. Read the intermediate rules into the Current Matrix. Check that the coefficients for all rules add to 1.00. If not, reject and terminate for error.
3. Check the principal diagonal of $A_c$ for all zeros. If not all zeros, for each non-zero element $A_{ii}$, multiply each element in that row other than $A_{ii}$ (in both $A_c$ and $B_c$) by the quantity $[1/(1-A_{ii})]$ and set $A_{ii}$ to zero (0).
4. Check the sum of the elements of each row of $A_c$ for exceeding the threshold. (The threshold can be set to zero.) If no such sum is greater than the threshold, set the final matrix to the current matrix. Terminate for completion.
5. Compute $A_c \times A_c$ and store the result in $A_a$.
6. Store a copy of $B_c$ in $B_a$.
7. Compute $A_c \times B_c$ and add to $B_a$.
8. Exchange the designation of the Current Matrix and Alternate Matrix.
9. Go to step 4.

Figures 3, 3A:
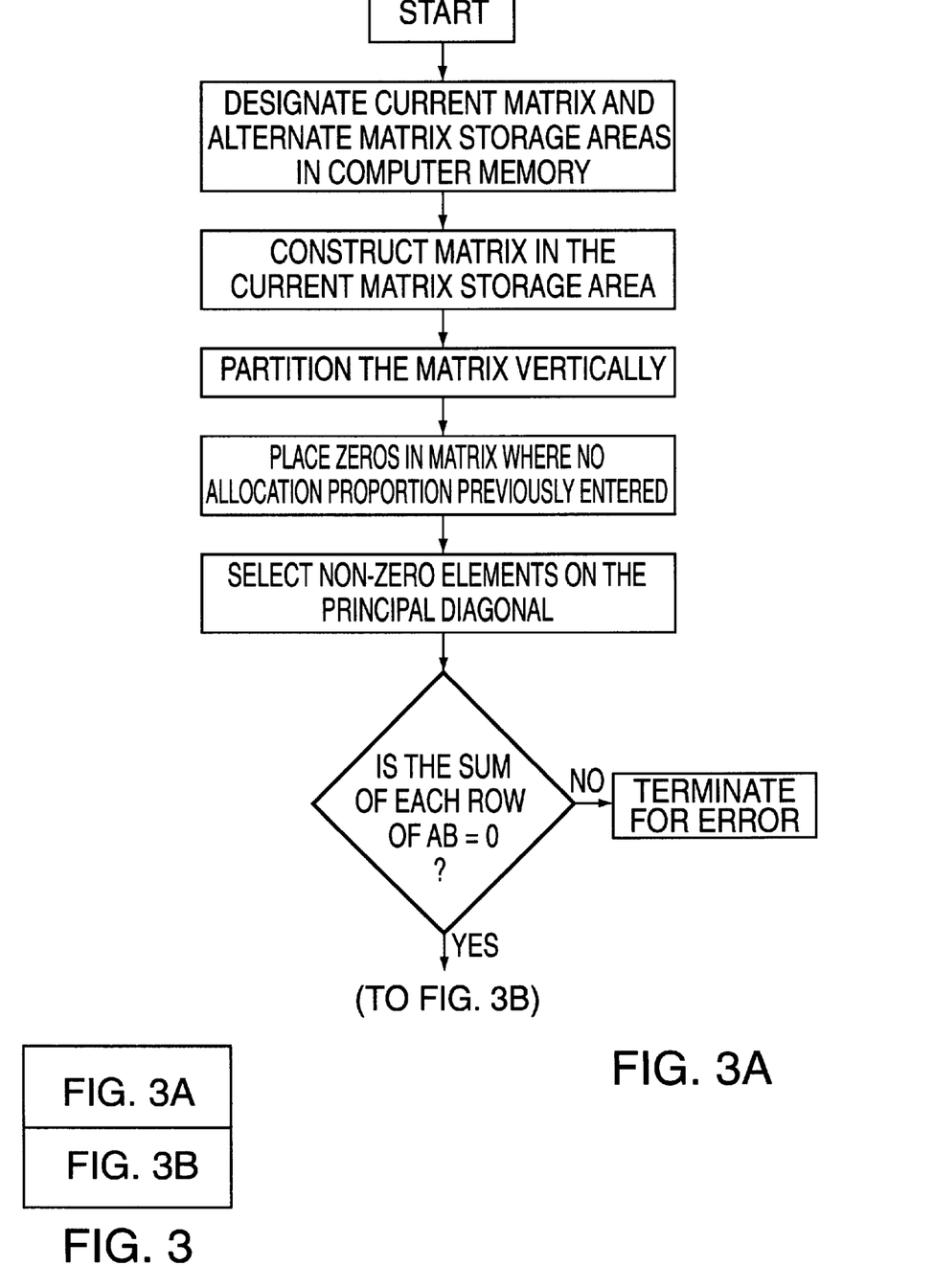
FIGS. 3A and 3B are a detailed flowchart of the allocation method.
Figure 3B:
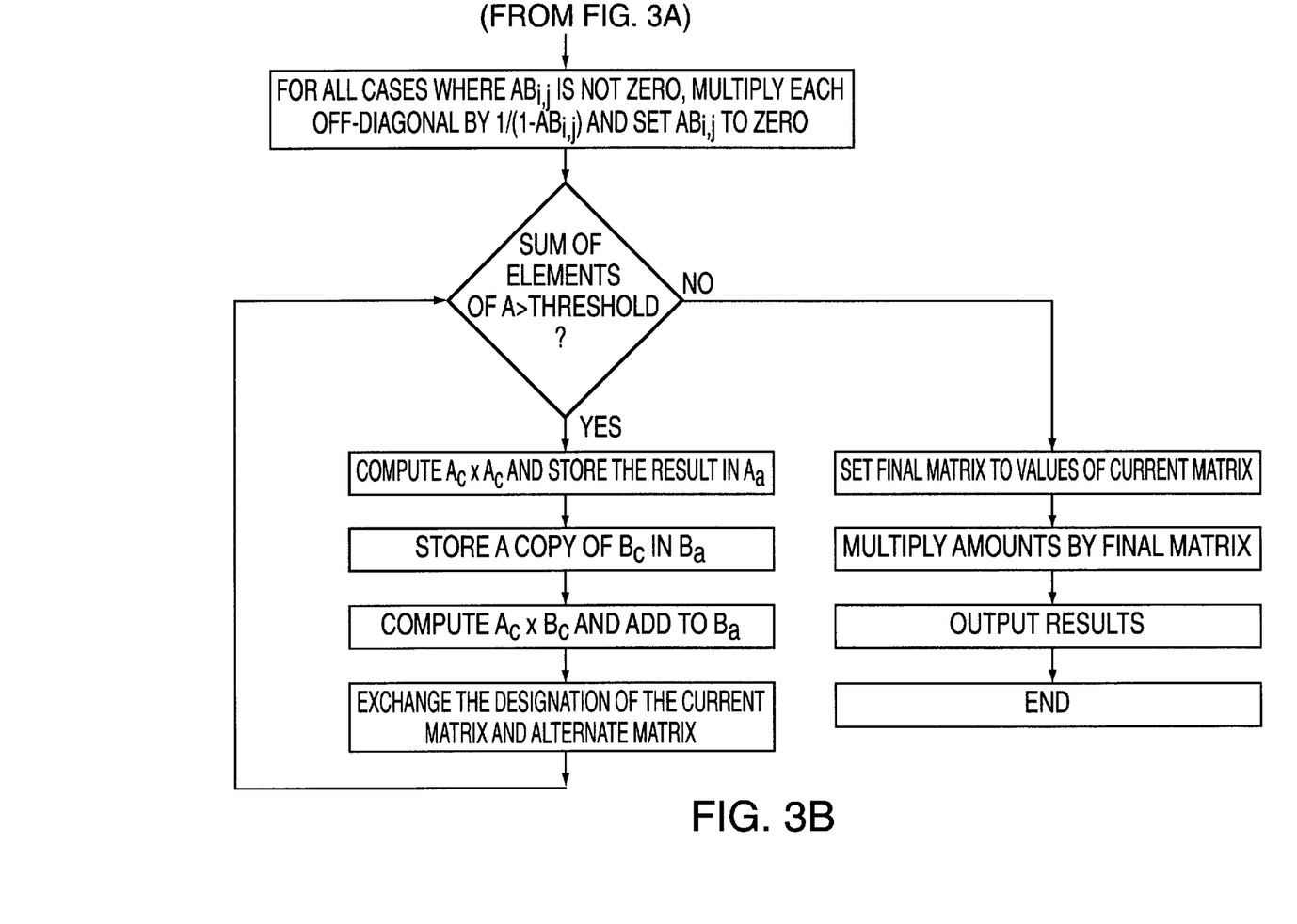

The foregoing is illustrated in the flowchart of FIGS. 3A and 3B.

Utilizing this invention's final matrix approach to cost allocation allows for a further improvement in the allocation process which is not available in the prior art. One can take advantage of the fact that a set of allocation rules will produce the same final matrix every time. Thus, in step 4 above, the final matrix may be stored for reuse at a later time. Then, if the same allocating rules are reused, one just reads the final matrix; there is no need to recalculate the final matrix. Any organization that periodically allocates costs according to fixed allocation rules may benefit. Not having to recompute the final matrix each time greatly improves the speed of the cost allocation process. In contradistinction, the prior art allocation methods entail no reusable computations because the actual costs to be allocated, which are different each time, are involved from step one.

Although this invention has been described with a certain degree of particularity, it is to be understood that the present disclosure has been made only by way of illustration and that numerous changes in the details of construction and arrangement of parts may be resorted to without departing from the spirit and scope of this invention.

For example, "sparse matrix technology" may be used to further quicken the calculation process. The matrix formed from the rules may have many rules, but a typical rule has only a limited number of destinations. Consequently, a vast majority of the matrix coefficients are zero.

If a computer is used to process the matrices, there is well-known software that process sparse matrices, such as the Hartwell Sparse Matrix Library. This software requires storage of only the non-zero coefficients and avoids calculations on zero elements of the matrices. This approach would save both computer memory and computational time, especially with large sets of rules and destinations, which produce large matrices.

In addition, this invention may be applied to other instances where reciprocal or cascading allocation occurs, such as allocating investments to pools where such pools may have basic assets or interests in other such pools. Thus, in a cascading manner, all pools can be expressed ultimately as purely basic assets, the allocation of which may be accomplished by applying this invention.

I claim:

1. For an accounting system comprising a plurality of accounts, the accounts comprising a plurality of terminal accounts, and a plurality of rules for allocating an amount among the terminal accounts, each rule comprising a plurality of coefficients equal in number to the number of accounts, and each coefficient being in a one-to-one correspondence with one of the accounts; a computer-implemented allocation method comprising the steps of:
   a. constructing a square matrix with a plurality of rows equal in number to the number of accounts, and a plurality of columns equal in number to the number of accounts;
   b. filling each row of the matrix with a different one of the rules so that each coefficient of that rule is in the column corresponding to the account to which that coefficient corresponds;
   c. transforming the matrix into a final matrix that permits one-step allocation of the amount among the terminal accounts;
   d. creating a final rule from each final row in the final matrix, each final rule comprising a plurality of coefficients equal to the final coefficients of that final row; and
   e. allocating the amount among the terminal accounts according to the final rules.

2. An allocation method as described in claim 1 in which an original matrix comprises the matrix as originally filled and the transforming step comprises iteratively multiplying the matrix by the original matrix yielding a final matrix until the final matrix equals the matrix prior to the latest multiplication.

3. An allocation method as described in claim 1 in which the transforming step comprises iteratively multiplying the matrix by itself yielding a final matrix until the final matrix equals the matrix prior to the latest multiplication.

4. An allocation method as described in claim 1 comprising the further step of storing the final matrix in a suitable form for later reuse.

5. An allocation method as described in claim 1 in which one of the coefficients in each row is a principal diagonal coefficient and the transforming step initially comprises individually scaling all coefficients in each row in which the corresponding principal diagonal coefficient has a non-zero value so that that principal diagonal coefficient results in a zero value.

6. An allocation method as described in claim 1, wherein the rules are cost-allocation rules and the amounts are costs.

7. An allocation method as described in claim 1, wherein the rules are investment-allocation rules and the amounts are investment assets.

8. For an accounting system comprising a plurality of accounts, the accounts comprising a plurality of terminal accounts, and a plurality of rules for allocating an amount among the terminal accounts, each rule comprising a plurality of coefficients equal in number to the number of accounts, and each coefficient being in a one-to-one correspondence with one of the accounts; a computer-implemented allocation method comprising the steps of:
   a. designating each rule as either a terminal rule or an intermediate rule;
   b. ordering the rules with intermediate rules grouped together and terminal rules grouped together;
   c. constructing a square matrix with a plurality of rows equal in number to the number of accounts and a plurality of columns equal in number to the number of accounts;
   d. filling each row of the matrix with a different one of the rules as ordered so that each coefficient of that rule is in the column corresponding to the account to which that coefficient corresponds;
   e. transforming the matrix into a final matrix that permits one-step allocation of the amount among the terminal accounts;
   f. creating a final rule from each final row in the final matrix, each final rule comprising a plurality of coefficients equal to the final coefficients of that final row; and
   g. allocating the amount among the terminal accounts according to the final rules.

9. An allocation method as described in claim 8 in which each terminal rule allocates from a terminal account exclusively to the same terminal account.

10. An allocation method as described in claim 9 in which an original matrix comprises the matrix as originally filled and the transforming step comprises iteratively multiplying the matrix by the original matrix yielding a final matrix until the final matrix equals the matrix prior to the latest multiplication.

11. An allocation method as described in claim 9 in which the transforming step comprises iteratively multiplying the matrix by itself yielding a final matrix until the final matrix equals the matrix prior to the latest multiplication.

12. An allocation method as described in claim 9 comprising the further step of storing the final matrix in a suitable form for later reuse.

13. An allocation method as described in claim 9 in which one of the coefficients in each row is a principal diagonal coefficient and the transforming step initially comprises individually scaling all coefficients in each row in which the corresponding principal diagonal coefficient has a non-zero value so that that principal diagonal coefficient results in a zero value.

14. For an accounting system comprising a plurality of accounts, the accounts comprising a plurality of terminal accounts, and a plurality of rules for allocating an amount among the terminal accounts, each rule comprising a plurality of coefficients equal in number to the number of accounts, and each coefficient being in a one-to-one correspondence with one of the accounts; a computer-implemented allocation method comprising the steps of:
   a. designating each rule as either a terminal rule or an intermediate rule;
   b. ordering the rules with intermediate rules grouped together and terminal rules grouped together;
   c. constructing a square matrix with a plurality of rows equal in number to the number of accounts and a plurality of columns equal in number to the number of accounts;

d. filling each row of the matrix with a different one of the rules as ordered so that each coefficient of that rule is in the column corresponding to the account to which that coefficient corresponds;

e. designating an intermediate portion of the matrix having rows corresponding to the intermediate rules and columns corresponding to intermediate accounts;

f. transforming the matrix into a final matrix that permits one-step allocation of the amount among the terminal accounts;

g. creating a final rule from each final row in the final matrix, each final rule comprising a plurality of coefficients equal to the final coefficients of that final row; and h. allocating the amount among the terminal accounts according to the final rules.

15. An allocation method as described in claim 14 in which each terminal rule allocates from a terminal account exclusively to the same terminal account.

16. An allocation method as described in claim 15 in which an original matrix comprises the matrix as originally filled and the transforming step comprises iteratively multiplying the matrix by the original matrix yielding a final matrix until the intermediate portion consists of all zero coefficients.

17. An allocation method as described in claim 15 in which the transforming step comprises iteratively multiplying the matrix by itself yielding a final matrix until the intermediate portion consists of all zero coefficients.

18. An allocation method as described in claim 15 comprising the further step of storing the final matrix in a suitable form for later reuse.

19. An allocation method as described in claim 15 in which one of the coefficients in each row is a principal diagonal coefficient and the transforming step initially comprises individually scaling all coefficients in each row in which the corresponding principal diagonal coefficient has a non-zero value so that that principal diagonal coefficient results in a zero value.

20. A computer accounting system for allocating among a plurality of accounts, the accounts comprising a plurality of terminal accounts, according to a plurality of rules for allocating an amount among the terminal accounts, each rule comprising a plurality of coefficients equal in number to the number of accounts, and each coefficient being in a one-to-one correspondence with one of the accounts, comprising:

a. means for constructing a square matrix with a plurality of rows equal in number to the number of accounts and a plurality of columns equal in number to the number of accounts;

b. means for filling each row of the matrix with a different one of the rules so that each coefficient of that rule is in the column corresponding to the account to which that coefficient corresponds;

c. means for transforming the matrix into a final matrix that permits one-step allocation of the amount among the terminal accounts;

d. means for creating a final rule from each final row in the final matrix, each final rule comprising a plurality of coefficients equal to the final coefficients of that final row; and e. means for allocating the amount among the terminal accounts according to the final rules.

21. A system as described in claim 20, in which an original matrix comprises the matrix as originally filled and the means for transforming comprises means for iteratively multiplying the matrix by the original matrix yielding a final matrix until the final matrix equals the matrix prior to the latest multiplication.

22. A system as described in claim 20 in which the means for transforming comprises means for iteratively multiplying the matrix by itself yielding a final matrix until the final matrix equals the matrix prior to the latest multiplication.

23. A system as described in claim 20 further comprising means for storing the final matrix in a suitable form for later reuse.

24. A system as described in claim 20 in which one of the coefficients in each row is a principal diagonal coefficient and the means for transforming comprises means for initially individually scaling all coefficients in each row in which the corresponding principal diagonal coefficient has a non-zero value so that that principal diagonal coefficient results in a zero value.

25. A computer accounting system for allocating among a plurality of accounts, the accounts comprising a plurality of terminal accounts, according to a plurality of rules for allocating an amount among the terminal accounts, each rule comprising a plurality of coefficients equal in number to the number of accounts, and each coefficient being in a one-to-one correspondence with one of the accounts, comprising:

a. means for designating each rule as either a terminal rule or an intermediate rule;

b. means for ordering the rules with intermediate rules grouped together and terminal rules grouped together;

c. means for constructing a square matrix with a plurality of rows equal in number to the number of accounts and a plurality of columns equal in number to the number of accounts;

d. means for filling each row of the matrix with a different one of the rules as ordered so that each coefficient of that rule is in the column corresponding to the account to which that coefficient corresponds;

e. means for transforming the matrix into a final matrix that permits one-step allocation of the amount among the terminal accounts;

f. means for creating a final rule from each final row in the final matrix, each final rule comprising a plurality of coefficients equal to the final coefficients of that final row; and g. means for allocating the amount among the terminal accounts according to the final rules.

26. A system as described in claim 25, further comprising means in which each terminal rule allocates from a terminal account exclusively to the same terminal account.

27. A system as described in claim 26, in which an original matrix comprises the matrix as originally filled and the means for transforming comprises means for iteratively multiplying the matrix by the original matrix yielding a final matrix until the final matrix equals the matrix prior to the latest multiplication.

28. A system as described in claim 26 in which the means for transforming comprises means for iteratively multiplying the matrix by itself yielding a final matrix until the final matrix equals the matrix prior to the latest multiplication.

29. A system as described in claim 26 further comprising means for storing the final matrix in a suitable form for later reuse.

30. A system as described in claim 26 in which one of the coefficients in each row is a principal diagonal coefficient and the means for transforming comprises means for initially individually scaling all coefficients in each row in which the corresponding principal diagonal coefficient has a non-zero value so that that principal diagonal coefficient results in a zero value.

31. A computer accounting system for allocating among a plurality of accounts, the accounts comprising a plurality of terminal accounts, according to a plurality of rules for allocating an amount among the terminal accounts, each rule comprising a plurality of coefficients equal in number to the number of accounts, and each coefficient being in a one-to-one correspondence with one of the accounts, comprising:

a. means for designating each rule as either a terminal rule or an intermediate rule;

b. means for ordering the rules with intermediate rules grouped together and terminal rules grouped together;

c. means for constructing a square matrix with a plurality of rows equal in number to the number of accounts and a plurality of columns equal in number to the number of accounts;

d. means for filling each row of the matrix with a different one of the rules as ordered so that each coefficient of that rule is in the column corresponding to the account to which that coefficient corresponds;

e. means for designating an intermediate portion of the matrix having rows corresponding to the intermediate rules and columns corresponding to intermediate accounts;

f. means for transforming the matrix into a final matrix that permits one-step allocation of the amount among the terminal accounts;

g. means for creating a final rule from each final row in the final matrix, each final rule comprising a plurality of coefficients equal to the final coefficients of that final row; and     h. means for allocating the amount among the terminal accounts according to the final rules.

32. A system as described in claim 31, further comprising means in which each terminal rule allocates from a terminal account exclusively to the same terminal account.

33. A system as described in claim 32, in which an original matrix comprises the matrix as originally filled and the means for transforming comprises means for iteratively multiplying the matrix by the original matrix yielding a final matrix until the intermediate portion consists of all zero coefficients.

34. A system as described in claim 32 in which the means for transforming comprises means for iteratively multiplying the matrix by itself yielding a final matrix until the intermediate portion consists of all zero coefficients.

35. A system as described in claim 32 further comprising means for storing the final matrix in a suitable form for later reuse.

36. A system as described in claim 32 in which one of the coefficients in each row is a principal diagonal coefficient and the means for transforming comprises means for initially individually scaling all coefficients in each row in which the corresponding principal diagonal coefficient has a non-zero value so that that principal diagonal coefficient results in a zero value.

37. For an accounting system comprising a plurality of accounts, the accounts comprising a plurality of terminal accounts, and a plurality of rules for allocating an amount among the terminal accounts, each rule comprising a plurality of coefficients equal in number to the number of accounts, and each coefficient being in a one-to-one correspondence with one of the accounts; a computer-implemented method comprising the steps of:

a. constructing a square matrix with a plurality of rows equal in number to the number of accounts and a plurality of columns equal in number to the number of accounts;

b. filling each row of the matrix with a different one of the rules so that each coefficient of that rule is in the column corresponding to the account to which that coefficient corresponds;

c. transforming the matrix into a final matrix that permits one-step allocation of the amount among the terminal accounts;

d. storing the final matrix;

e. creating a final rule from each final row of the final matrix, each final rule comprising a plurality of coefficients equal to the final coefficients of that final row; and     f. allocating the amount among the terminal accounts according to the final rules.

* * * * *